United States Patent [19]

Ridder et al.

[11] 4,179,887
[45] Dec. 25, 1979

[54] HYDRAULIC CONTROL WITH DELAY

[75] Inventors: Gerhard Ridder; Wilhelm Schäfer, both of Witten-Bommern, Fed. Rep. of Germany

[73] Assignee: Mannesmann Aktiengesellschaft, Düsseldorf, Fed. Rep. of Germany

[21] Appl. No.: 899,067

[22] Filed: Apr. 24, 1978

[30] Foreign Application Priority Data

May 25, 1977 [DE] Fed. Rep. of Germany ....... 2724233

[51] Int. Cl.² .............................................. F15B 11/20
[52] U.S. Cl. ........................................ 60/420; 60/459; 60/484; 137/109
[58] Field of Search ................. 60/420, 435, 436, 459, 60/484; 137/109, 118

[56] References Cited

U.S. PATENT DOCUMENTS 2,737,196  3/1956  Eames ............................... 137/118 X
3,817,266  6/1974  Dymond ........................... 137/118 X
3,978,666  9/1976  Kelly et al. ............................ 60/459

Primary Examiner—Edgar W. Geoghegan
Attorney, Agent, or Firm—Smyth, Pavitt, Siegemund, Jones & Martella

[57] ABSTRACT

Two hydraulic brakes or clutches being primary users, are alternately, delayedly, hydraulically energized from a constant volumetric flow rate pump feeding also a secondary user via a pressure controller with a differential piston operated by feedback ducts from the primary users via a throttle valve. The latter valve is bypassed through a check valve for undelayed de-energization. A selector valve is disposed between the branch point for the secondary user and upstream as to energizing fluid from the feedback connection to the primary user. The pressure controller is described further as to several structural details.

7 Claims, 5 Drawing Figures

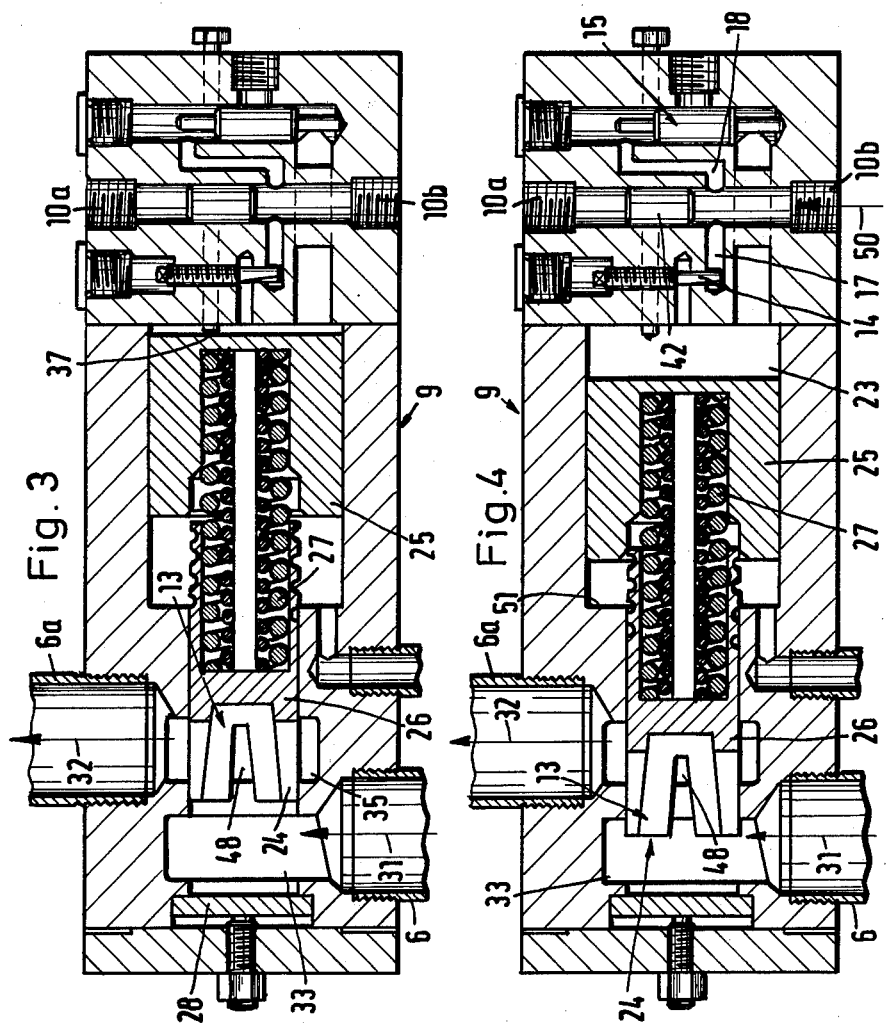

HYDRAULIC CONTROL WITH DELAY

BACKGROUND OF THE INVENTION

The present invention relates to a hydraulic device for controlling a delayed pressure change in a clutch or brake of a transmission shifted or otherwise operated under load.

A hydraulic device of the type to which the invention pertains may include a pump for the pressure medium operating essentially on the basis of a constant rate of fluid flow by volume; conduit means being connected to the pump, the clutch or brake; and control valve means for primary activation and de-activation of the clutch or brake. German printed patent application 25 12 778 discloses such a device and that device includes additionally a pressure control in the fluid path between the pump and the clutch or brake. A relief conduit from the clutch or brake is branched off a control conduit in the controller. Moreover, the controller includes a stepped or differential position for gradually closing this relief conduit when the clutch is energized to thereby obtain a gradual increase from zero pressure to operating pressure in the clutch. The piston must, however, open the relief conduit at least to the extent so that rapid action de-energization be permitted. It was found, however, that energizing and/or de-energizing a brake or clutch under load has a detrimental effect on any secondary user of pressure oil such as a circulating lubrication system. This is particularly so as the operating pressure of the secondary user is generally lower than the operating and energizing pressure of the primary user, e.g. the clutch.

DESCRIPTION OF THE INVENTION

It is an object of the present invention to provide for a pressure medium device and circuit in which a primary and a secondary user are both connected to a pressure fluid pump and operate without undue mutual interference.

It is another object of the present invention to provide for a hydraulic system in which one of two primary users is to be selectively energized under gradual build-up of operating pressure.

In accordance with the preferred embodiment of the present invention, it is suggested to connect one or more primary users (such as clutches or brakes) to a pump with a constant volumetric flow rate of hydraulic fluid and via an on-off selection valve. A feed-back branch line loads from the feeder line of the primary user via a throttle valve to one chamber portion of a differential piston whose other piston chamber portion is in a flow path from the pump to a secondary user of fluid whereby a throttle member of the differential piston in that other chamber governs the flow to that secondary user, thereby acting as a pressure controller for the pressure, particularly in the branch point from the pumps towards primary and secondary users. The first mentioned piston chamber portion can be discharged via a check valve bypassing the throttle for rapid action de-energization of the primary user. The secondary user operates under a reduced pressure, but continues to receive operating fluid throughout. Moreover, whenever a primary user (clutch or brake) is connected to the feeder line by operation of the on-off valve, a particular pressure (lower than final operating pressure for the primary user) is immediately available to operate the differential piston via the feed-back branch.

In the case of two primary users, separate feed-back conduits are provided one which is closed off by operation of the pressure in the other one. One will use here preferably a flying piston type valve in a bore from which branches off a duct loading to the throttle valve. The above mentioned on-off valve will also function as primary user selector.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 3, 4 and 5 show the device of FIG. 2 on a smaller scale and in different operational states.

Proceeding now to the detailed description of the drawings, FIG. 1 shows a pump 1 for a hydraulic pressure fluid, e.g. oil, sucking such fluid out of a reservoir 3 via a suction line 2 and feeding pressurized fluid into a pressure conduit or line 4 at a constant volumetric rate of flow. A branch line or conduit 5 connects line 4 to a control valve 8 which selects one or none of two feeder/discharge lines 5a and 5b being respectively connected to two primary users 11a and 11b which may be clutches or brakes. These elements may pertain to a transmission. In the illustrated position of valve 8 both lines 5a, 5b and, therefore, both users 11a, 11b are disconnected from the pressurized conduit 5 and are connected instead to a return path duct 21, returning hydraulic fluid from the primary users to the reservoir. In the upper position of valve 8, user 11b is connected to pressure conduit 5 while user 11a is connected to the discharge and return conduit 21. The situation is reversed for the lower portion of valve 8.

Figure 1:
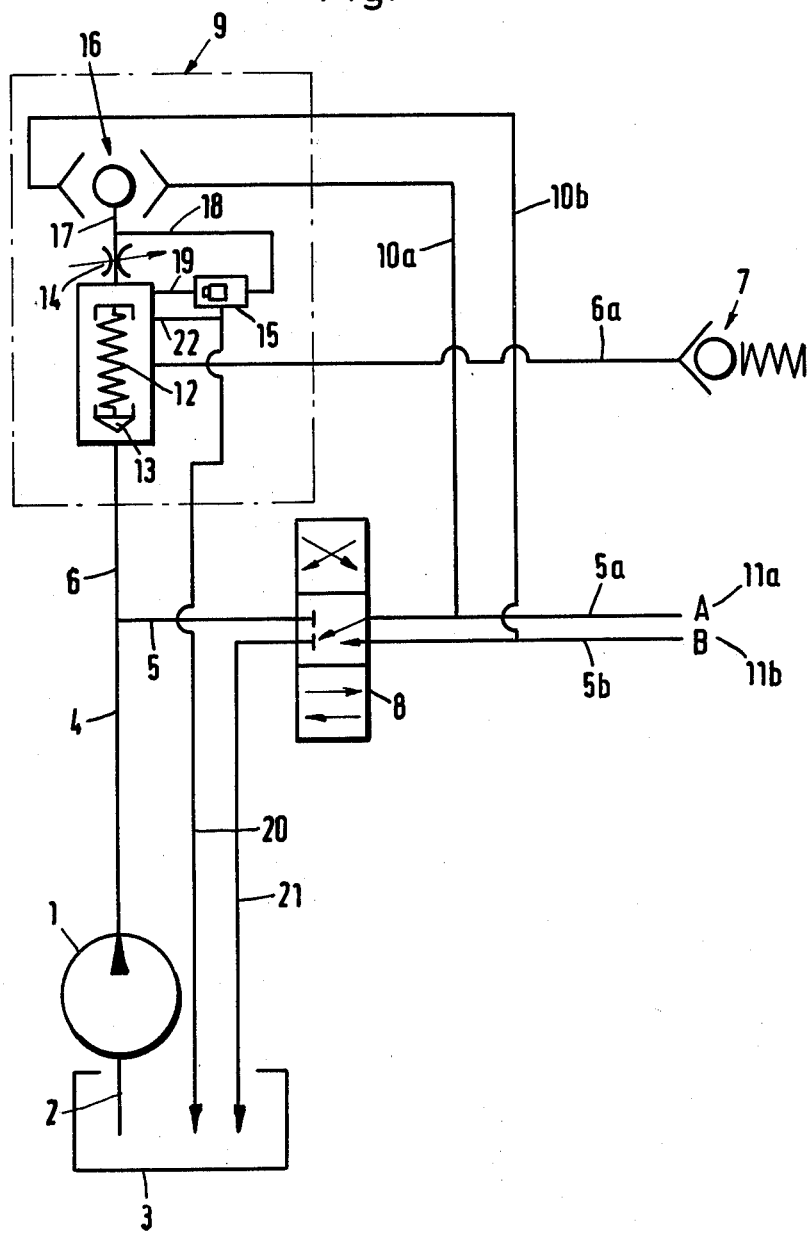
FIG. 1 is a schematic view of a hydraulic device for controlling the pressure increase in one of two brakes or clutches, to be selected prior to the hydraulic energization.

A second branch line 6 from pressure line 4 connects to a pressure controller 9 to be described more fully below and being provided for controlling fluid flow to another, secondary user 7 such as a lubrication nozzle, being connected to controller 9 by a conduit or line 6a which is in effect a continuation of conduit 6 but for the inter-positioning of a part of controller 9.

The pressure controller 9 includes a stepped or differential piston 12 being connected to a throttling element 13 which governs the passage of fluid from 6 to 6a. The smaller diameter portion of piston 12 is acted upon by the pressure in conduit 6 for opening the passage of fluid to the secondary user 7.

The control and feedback conduits 10a and 10b branch respectively off the feeder conduits 5a, 5b for controlling the controller 9. Both feedback conduits 10a, 10b lead to a switch 16 to place the controller 9 under operative control by that one of the primary user circuits which has been selected by the valve 8 for respective hydraulic energization. Switch 16 is connected to a conduit 17 which, in fact, continues that one of conduits 10a, 10b whose associated primary user has been hydraulically energized by the valve 8. Line or conduit 17 is connected to a flow rate reducing, throttling valve 14 feeding the other side of the chamber in which piston 12 is located to apply thereto fluid in a graduated and delayed fashion for gradually building up the pressure on that side of the differential piston. One can also say that throttle 14 is serially connected between one piston chamber and one or the other of the two feedback conduits 10a, 10b. The position of piston 12 depends on the pressure balance as between the pressure built-up via throttle 14 and the pressure in conduit 6.

A branch duct 18, tapping conduit 17, includes a check valve 15 which connects also to the piston chamber via duct 19 to open up a bypass from the piston chamber to a return path duct 20. Duct or conduit 20 provides also for return of fluid to reservoir 3.

Figure 2:
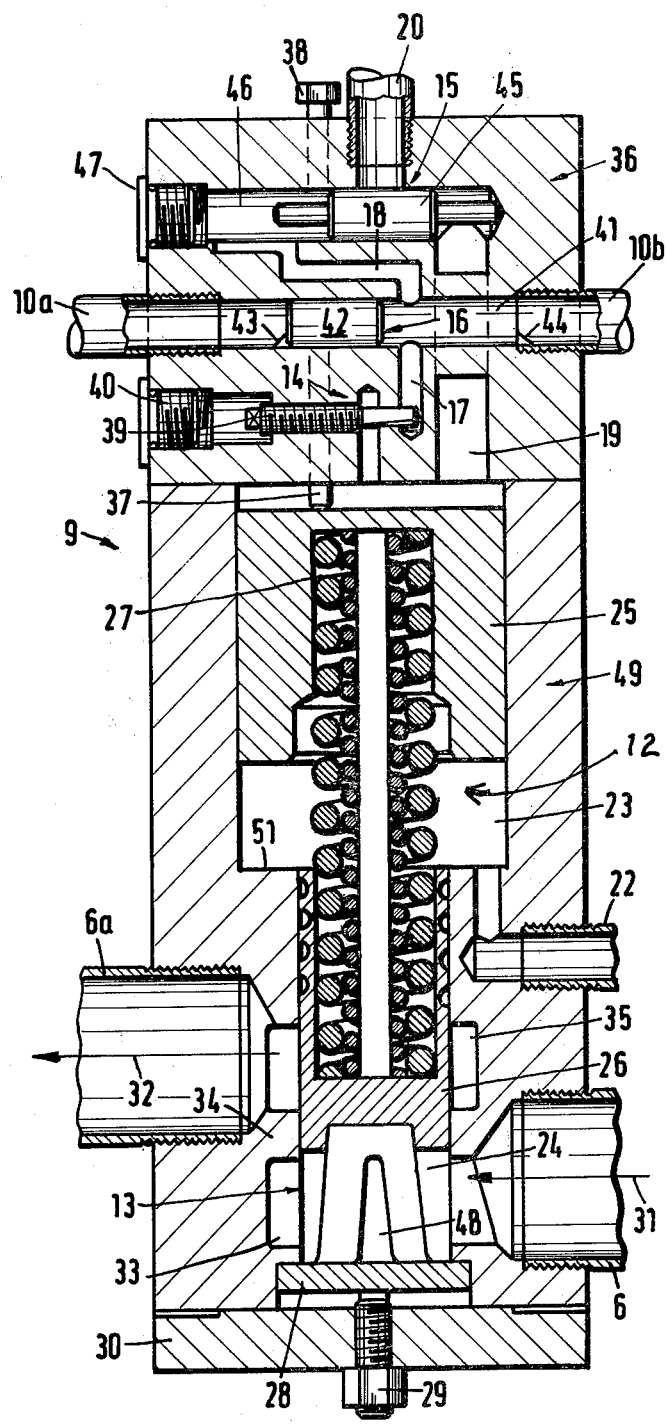
FIG. 2 is a section view of a portion of the device shown in FIG. 1.

After having described the overall layout of the system, we turn to construction details illustrated in FIG. 2. FIG. 2 shows particularly the controller 9 and connecting conduits. The controller 9 includes a case or tubular housing 49 having a bore whose diameter is stepped down in one direction to accommodate the stepped-diameter or differential piston 12. In other words, housing 49 contains two contiguous piston chambers of different diameter, a chamber 23 of large diameter and a chamber 24 of smaller diameter. The end of tubular housing 49 and adjacent to small diameter piston chamber 23 is covered by a disk 30, the other end by an end piece cover or member 36. The latter element is shown as a single piece; in practice, however, one will use several superposed disks for purposes of manufacturing more easily the several ducts, channels and chambers in the element or member 36. It should be noted further that the several ducts as illustrated are not necessarily located in one plane but are azimuthally offset or provided with suitable bypasses whenever intersection is not permitted.

The piston 12 assembly or differential piston means is comprised of a small diameter piston 26 being integral with control member 13, the latter is normally seated on a stop 28, particularly for de-energized primary user. The stop 28 is adjustable by means of an adjusting screw 29 in cover 30. Piston 26 moves in the smaller piston chamber 24.

Differential piston assembly 12 includes further a large diameter piston 25 moving in the large piston chamber 23 and being connected to piston 26 by means of a compression spring means 27. The spring means 27 are comprised of two concentric helical springs and urge the piston 25 against a stop 37 being adjusted by a screw 38. In other words, with no (or insufficient) hydraulic pressure acting on either piston, they are both urged against the respective stops.

Arrow 31 denotes symbolically the application of pressure fluid through the pressure line or conduit 6 to the controller 9, while arrow 32 denotes the fluid discharge from the pressure controller into duct or conduit 6a. Duct, conduit or line 6 is connected to an annular entrance chamber 33 circumscribing the smaller piston chamber 24. Conduit 6a is connected to an annular discharge chamber 35 also circumscribing chamber 24 and being axially offset from chamber 33. It can readily be seen that piston 26 blocks any fluid communication between conduits 6 and 6a when in the illustrated position, i.e. when throttle member 13 rests against stop plate 28.

Turning now to the upper part of FIG. 2 and more particularly to member or element 36, the two feedback ducts or conduits 10a and 10b are connected thereto in radially opposing locations and both communicate with a duct 41, containing a flying piston 42. Duct 41 is provided with two stops 43 and 44 to limit the range of movement of the piston.

Duct 17 branches off duct 41 halfway between the two stops 43, 44. As shown, whenever piston 42 abuts stop 43 the right hand end of the piston clears the entrance to duct 17. Analogously, whenever piston 42 abuts stop 44, the left hand end of the piston also clears duct 17. Thus, piston 42 selectively connects feedback conduit 10a or 10b to conduit or duct 17, while closing the respective other one.

Conduit 17 leads to the throttle 14 whose effective aperture is adjustable by means of an adjustment spindle 39 for purposes of adjusting the pressure drop in and flow rate through the throttle 14. A cover screw 40 protects spindle 14 and must be removed to adjust the spindle.

A duct 18 branches off duct 41 opposite the junction of the latter with duct 17 and runs to a chamber 46 which is normally closed by a screw 47. The discharge channel or chamber 46 contains a flying piston 45 being the pressure responsive member of the check valve 15. The piston 45 is shown in FIG. 2 in one terminal position in which it blocks and closes the return path conduit 20 and more particularly it closes the connection between that return conduit 20 and discharge channel 19 leading also to the large piston chamber 23. This closing position of the check valve would be maintained if pressure were applied to the piston 45 through the duct 10b in this instance. Since, as will be shown below, the pressure in bore 41 is larger during an energization phase than in the piston chamber 23, the check valve positively closes the path between conduits 19 and 20. Upon de-pressurization of bore 41 due to a change in position of valve 8, the valve 15 opens under the now prevailing pressure from chamber 23.

The device as described operates as follows. It shall be assumed that the pump 1 operates and provides pressure fluid to conduits 4, 5 and 6 and particularly the latter line applies that fluid through the throttling slots 48 of member 13 to the small piston 26 shifting the latter from the position shown in FIG. 3, and against the force of springs 27. Large piston 25 remains in abutment with stop 37 as adjusted. The operating pressure in that part of the system is relatively low.

The slots 48 are sufficiently long so that a fluid path is opened into annular chamber 35 and from there to duct 6a. Thus, a communication path is established between ducts 6 and 6a. Moreover, the slots 48 are sufficiently wide to permit substantially unrestricted passage of fluid from conduit 6 to conduit 6a, corresponding to the pressure of the fluid, as that pressure keeps the passage open. Adjustment of stop 37 permits adjustment between the fluid pressure and piston displacement.

As far as the primary users is concerned, it is assumed that valve 8 has the position shown in FIG. 1, so that pressure is not applied to either branch conduits 10a. This means that the position of piston 42 is actually undefined. This is not detrimental as in either situation piston 25 is not being acted upon hydraulically. It is likewise immaterial at this point whether valve piston 45 actually disconnects the piston chamber 23 from the discharge and return path conduit 20. Adequate, minimal friction may ensure that movable parts retain their position as per hydraulic de-energization.

It may now be assumed that valve 8 changes position and connects one of the primary users, e.g. clutch or brake 11b to pressure line 5. Accordingly, line 10b is pressurized (arrow 50 in FIG. 4). Since the pump is presumed to operate at approximately a constant volumetric flow rate, the amount of fluid now flowing into the duct or conduit 5b is not very large and the effective pressure is not larger either. Thus, the pressure in line 10b is not the full fluid pressure for the primary user. This particular pressure is applied to piston 42 to hold the piston in the assumed position or to shift it into the position as shown in FIG. 4 should the initial conditions have been different; in either case, the pressure in line 10b is transmitted to duct 18 to thereby hold check valve 15 (piston 45) in the position of closing conduit and duct 20.

Pressure is also applied to conduit and duct 17 and reduced by throttle 14 to slow the flow of pressure fluid into the piston chamber 23. The pressure build-up in that chamber is delayed accordingly so that the piston 25 is delayedly and gradually shifted away from stop 37. The chamber between pistons 25 and 26 is vented into return path 20 via duct 22. As soon as the resulting force prevails over the pressure acting on the small piston 26, the latter tends to move back towards stop plate 28 and the slots 48 gradually throttle the flow between the ducts 6 and 6a. Consequently, the pressure increases in chamber 33 and in conduit 6 with feedback acting as pressure increase in lines 10b and 5b. This, in turn, increases the hydraulic force on piston 25 so that piston 26 is pushed further by positive feedback.

Figure 5:
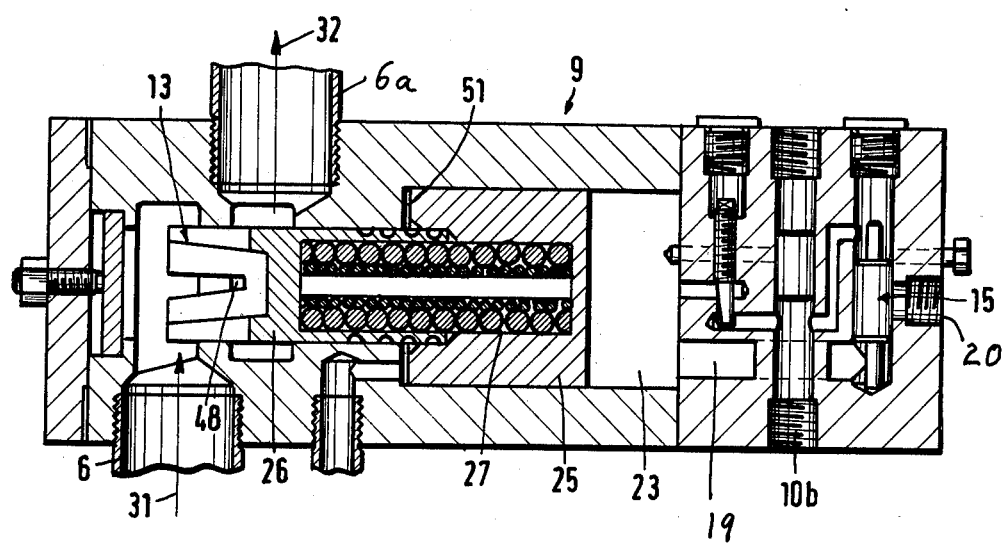

Piston 25 stops when abutting stop 51 (FIG. 5). Piston 26 assumes a position which depends on the balance of forces, but should be adjusted so that a minimal flow passage still exists through slots 48. Thus, pressure fluid will still reach the user 7. On the other hand, the pressure as now applied to the primary user 11b is higher than before, because the constant volume pump has to work against a throttle passage from 6 to 6a.

It can further be seen that on account of the constant (or at least approximately consistent) volumetric feeder rate of the pump, secondary user 7 received a relatively large quantity of fluid at a lower pressure whenever the primary users were disconnected and de-energized. Presently, a primary user is energized and member 13 provides for a throttling of flow to thereby reduce the pressure as applied by the pump, but the pump itself now furnishes the fluid at a higher pressure, being effective on the primary user.

If valve 8 is shifted back to the off position, user 11b and conduit 10b are load relieved so that piston 25 returns and piston 26 follows to open a larger passage from 6 to 6a (FIG. 3). The de-energization is not delayed because pressure in line 10b collapses as soon as the conduit 5b is connected to the discharge conduit 21. As soon as piston 25 begins to return, it pushes fluid from chamber 23 into duct 19 and shifts the check valve piston 45 so that now fluid can flow into the discharge duct 20, by-passing the delay producing throttle 14. Thus, fluid in conduits 10b, 5b is not replenished from the chamber 23. The check valve returns to closing position when the oil has been shifted out and the pressure on piston 45 has equalized via the throttle 14.

It can readily be seen that the operation is similar upon placing valve 8 into the lower position, connecting under 11a and conduit 10a to the pressure line 5.

Pressure in line 10a will shift piston 42 into the alternative position so that ducts 17 and 18 become connected to line and conduit 10a. The operation and action of pistons 25 and 26 are the same as before, i.e. their operation is invariant to the user selection.

It can also be seen, that the pressure build-up in the primary user is not produced by gradual throttling a bleeder path. Conduits 10a, 10b do not have that function. Rather, the pressure is built-up in the primary user by graduating throttling (but not interrupting!) the flow of fluid to the secondary user (7) through positive feedback whose effect is delayed by the throttle 14.

The invention is not limited to the embodiments described above but all changes and modifications thereof not constituting departures from the spirit and scope of the invention are intended to be included.

We claim:

1. Hydraulic device for delayed pressurization of primary user of hydraulic fluid such as a clutch or brake while maintaining a reduced flow of fluid to an independently operating secondary user, comprising:

a pump for the fluid operating at an essentially constant flow rate by volume;

first conduit means connected to the pump to receive therefrom pressurized fluid;

second and third conduit means branching off the first conduit means, the primary user being connected to the second conduit means, the secondary user being connected to the third conduit means;

a control valve connected in the second conduit means for on-off control of hydraulic energization of the primary user;

a pressure controller including a differential piston in a corresponding piston chamber and being connected in the third conduit means, wherein a first piston of the differential piston operates under pressure as applied from the first conduit means to open a pressure dependent fluid passage to the secondary user through the piston chamber;

fourth conduit means branching off the second conduit means between the control valve and the primary user and including a flow retaining throttle valve connected to a second portion of the differential piston to operate the differential piston in dependence upon the flow conditions of the throttle valve; and a check valve connected to the piston chamber and to a second piston, by-passing the throttle for rapid action venting of the piston chamber portion in which the second piston moves.

2. Device as in claim 1, said first piston being of smaller diameter than the second piston, the pistons being interconnected by spring means, there being stop means in the piston chamber against which the spring means urges both said pistons.

3. Device as in claim 1, there being two primary users, the second conduit means leading separately to the primary users from the control valve, the fourth conduit means having separate branches;

flying piston type valve means in the separate branches for connecting one or the other of the separate branches to the throttle valve.

4. Device as in claim 3, the controller including a housing having a bore containing said flying piston, the bore having said separate branches connected to opposite ends, the throttle being connected to a central portion of said bore and in between stops for the flying piston against which flying pistons abuts when causing the throttle to be connected to one or the other of the separate branches.

5. Hydraulic device as in claim 1, said first piston moving in a chamber portion having two axially spaced annular chambers, and including a throttle member for controlling the passage of fluid between the annular chambers, one of the chambers being included in a portion of the third conduit means, the other of the annular chambers being connected to the secondary user.

6. Hydraulic device as in claim 1, the pressure controller including a tubular body defining the piston chamber, first axial end plate means including stop means for a throttle member being integral with the first piston portion; and second axial end means which includes stop means for the second piston portion and contains said throttle valve and said check valve.

7. Apparatus for controlling the gradual build-up of pressure in a hydraulic device such as a brake or a clutch, comprising:
   a constant volumetric flow rate pump for hydraulic fluid;
   a hydraulic circuit including a first conduit connected to the pump for receiving fluid therefrom; further, including a hydraulic valve connected to the first conduit, and a second conduit connecting the valve to the device;
   conduit means branching off the first conduit;
   a differential piston-operated throttle member in the conduit means, the throttle member being operated for opening by means of hydraulic pressure in the conduit means;
   a feedback conduit connected to the second conduit to receive therefrom any pressurized hydraulic fluid when and if applied via the valve to the device; and
   a hydraulic throttle valve serially connected to the feedback means and applying feedback pressure fluid to the differential piston to operate the piston in opposition to the pressure in the conduit means towards decreasing the passage of fluid through the conduit means, thereby increasing the pressure of the fluid as applied to the device by the second conduit.

* * * * *